(12) United States Patent
Rudstedt et al.

(10) Patent No.: US 9,522,365 B2
(45) Date of Patent: Dec. 20, 2016

(54) CROSS-LINKED CELLULOSE MEMBRANES

(75) Inventors: Asa Rudstedt, Uppsala (SE); Andreas Axen, Uppsala (SE); Nils Norrman, Uppsala (SE); Anders Larsson, Uppsala (SE)

(73) Assignee: GE Healthcare BioProcess R&D AB, Uppsala (SE)

( * ) Notice: Subject to any disclaimer, the term of this patent is extended or adjusted under 35 U.S.C. 154(b) by 777 days.

(21) Appl. No.: 12/523,323

(22) PCT Filed: Feb. 7, 2008

(86) PCT No.: PCT/EP2008/000945
§ 371 (c)(1),
(2), (4) Date: Jul. 16, 2009

(87) PCT Pub. No.: WO2008/095709
PCT Pub. Date: Aug. 14, 2008

(65) Prior Publication Data
US 2010/0059440 A1 Mar. 11, 2010

(30) Foreign Application Priority Data
Feb. 9, 2007 (GB) .................................. 0702504.2

(51) Int. Cl.
*B01D 71/16* (2006.01)
*B01J 20/26* (2006.01)
(Continued)

(52) U.S. Cl.
CPC ........... *B01D 71/10* (2013.01); *B01D 67/0093* (2013.01); *B01D 71/16* (2013.01); *B01J 20/262* (2013.01);
(Continued)

(58) Field of Classification Search
CPC ....... B01J 20/265; B01J 20/267; B01J 20/285; B01J 20/286; B01J 20/3244; B01J 20/28033; B01J 20/28085; B01D 71/10; B01D 67/0093; B01D 2323/16; B01D 2323/30; B01D 2323/48; B01D 2323/36
See application file for complete search history.

(56) References Cited

U.S. PATENT DOCUMENTS 4,063,017 A 12/1977 Tsao et al.
4,175,183 A * 11/1979 Ayers ..................... B01J 20/22
536/57

(Continued)

FOREIGN PATENT DOCUMENTS

EP 0 343 387 6/1994
EP 1 470 854 10/2004
(Continued)

OTHER PUBLICATIONS

Unofficial English translation of Office Action issued in connection with corresponding JP Application No. 2009-548624 on Mar. 5, 2013.
(Continued)

*Primary Examiner* — Katherine Zalasky
(74) *Attorney, Agent, or Firm* — Wood IP LLC

(57) ABSTRACT

The invention relates to a process for making porous cross-linked charged cellulosic polymeric membranes capable of binding to a target molecule. The invention provides methods for separating target molecules from other components in a solution comprising use of membranes obtainable by the process of the invention. The method has particular utility in separating proteins and nucleic acids from cell lysates and cultures.

8 Claims, 1 Drawing Sheet

(51) Int. Cl.
*B01J 20/28* (2006.01)
*B01J 20/285* (2006.01)
*B01J 20/286* (2006.01)
*B01J 20/32* (2006.01)
*B01D 71/10* (2006.01)
*B01D 67/00* (2006.01)
*B01D 61/14* (2006.01)
*B01D 15/36* (2006.01)
*B01D 15/38* (2006.01)

(52) U.S. Cl.
CPC ............ *B01J 20/265* (2013.01); *B01J 20/267* (2013.01); *B01J 20/285* (2013.01); *B01J 20/286* (2013.01); *B01J 20/28033* (2013.01); *B01J 20/28085* (2013.01); *B01J 20/3242* (2013.01); *B01J 20/3244* (2013.01); *B01D 15/36* (2013.01); *B01D 15/3804* (2013.01); *B01D 2323/30* (2013.01); *B01D 2325/14* (2013.01); *B01D 2325/16* (2013.01)

(56) References Cited

U.S. PATENT DOCUMENTS

| | | | | |
|---|---|---|---|---|
| 4,512,896 | A * | 4/1985 | Gershoni | 210/635 |
| 4,541,972 | A * | 9/1985 | Wernick | B01D 67/0011 208/33 |
| 4,678,555 | A * | 7/1987 | Wernick | B01D 67/0011 208/308 |
| 4,690,766 | A * | 9/1987 | Linder | B01D 61/025 210/500.28 |
| 4,794,002 | A * | 12/1988 | Henis | B01D 67/0088 424/484 |
| 5,098,569 | A * | 3/1992 | Stedronsky | B82Y 30/00 210/500.29 |
| 5,739,316 | A * | 4/1998 | Beer et al. | 536/56 |
| 6,780,327 | B1 * | 8/2004 | Wu | G01N 33/54393 210/488 |
| 8,496,123 | B2 | 7/2013 | Axen et al. | |
| 2004/0206693 | A1 | 10/2004 | Charkoudian et al. | |
| 2004/0206694 | A1 * | 10/2004 | Charkoudian | 210/500.29 |
| 2008/0179248 | A1 * | 7/2008 | Axen et al. | 210/650 |

FOREIGN PATENT DOCUMENTS

| | | |
|---|---|---|
| JP | 52129788 A | 10/1977 |
| JP | 55129156 A | 10/1980 |
| JP | 60501126 A | 7/1985 |
| JP | 0368431 A | 3/1991 |
| JP | 10500897 A | 1/1998 |
| JP | 2004314072 A | 11/2004 |
| JP | 2004314073 A | 11/2004 |
| JP | 5143732 B2 | 2/2013 |
| WO | WO 9532793 | 12/1995 |
| WO | WO 2005/077528 | 8/2005 |
| WO | WO 2007/017085 | 2/2007 |

OTHER PUBLICATIONS

European Search Report in corresponding Application No. 08715706.1 dated Jul. 15, 2016.

* cited by examiner

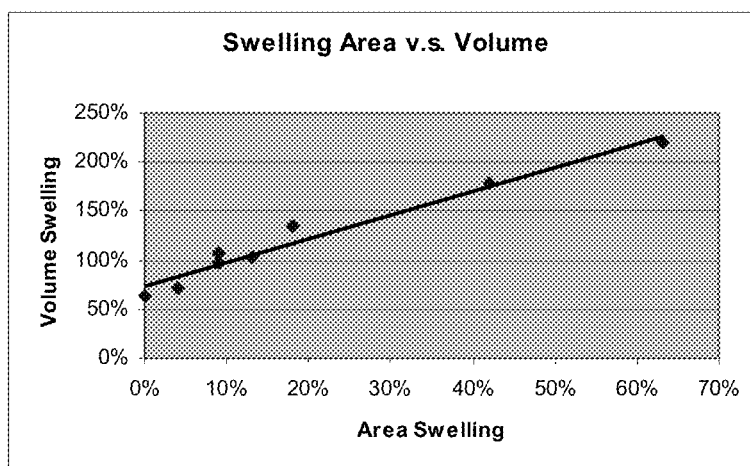

CROSS-LINKED CELLULOSE MEMBRANES

CROSS-REFERENCE TO RELATED APPLICATIONS

This application is a filing under 35 U.S.C. §371 and claims priority to international patent application number PCT/EP2008/000945 filed Feb. 7, 2008, published on Aug. 14, 2008, as WO 2008/095709, which claims priority to patent application number 0702504.2 filed in Great Britain on Feb. 9, 2007.

FIELD OF THE INVENTION

The present invention relates to processes for cross-linking cellulosic polymeric membranes to increase their adsorption capacity for target molecules, particularly biomolecules, when substituted with binding ligands. The invention also relates to methods for separating target molecules from solutions using membranes produced by the process of the invention.

BACKGROUND OF THE INVENTION

Chromatographic separation of target molecules is of great commercial interest in the chemical and biotechnological fields, such as the large-scale production of novel biological drugs and diagnostic reagents. Furthermore, the purification of proteins has recently become of great significance due to advances in the field of proteomics, wherein the function of proteins expressed by the human genome is studied. Besides proteins, nucleic acids such as plasmid DNA and particles such as virus particles also need to be purified by chromatographic means e.g. in vaccine production and for gene therapy purposes.

In general, proteins are produced in cell culture, where they are either located intracellularly or secreted into the surrounding culture media. Since the cell lines used are living organisms, they must be fed with a complex growth medium, containing sugars, amino acids, growth factors, etc. Separation and purification of a desired protein from the complex mixture of nutrients and cellular by-products, to a level sufficient for therapeutic usage, poses a formidable challenge.

Porous polysulphone and cellulosic membranes are widely used for filtering and separating chemical and biological mixtures (cf. EP0483143). These membranes include ultra- and microfiltration membranes, in which the filtration process is based on a hydrostatic pressure differential. Ultrafiltration membranes are characterized by pore sizes which enable them to retain macromolecules having a molecular weight ranging between 500 and 1,000,000 Daltons.

Microfiltration membranes exhibit permselective pores ranging in diameter between 0.01 and 10 microns (µm), as measured by bubble point testing. For adsorptive separations, where membranes are substituted with ligands to bind the target species, microfiltration membranes are typically used. In order to avoid any pore filtration effects it is preferred to use membranes with a pore size >0.1 µm or even >0.5 µm, i.e. well above the size of the largest intended target species and high enough to give a high flow rate. Larger pore sizes give even better flow rates, but with conventional membranes the adsorption capacities will then be too low, due to the lower available surface area.

Despite their widespread usage, cellulosic membranes suffer a number of disadvantages, including susceptibility to attack by strong acids and bases, and by cellulase enzymes. Sensitivity to bases is characterized initially by shrinkage and swelling, ultimately leading to decomposition of the membrane. High temperatures promote chemical disintegration and shrinkage while low temperatures, especially in connection with substantial concentrations of alkali, promote swelling and bursting. The pore structure of the membrane can easily be destroyed resulting in a dramatic decrease in the flow rate through the membrane.

From the experience of the textile industry, it has long been known that better characteristics may be imparted to cellulosic fibers by cross-linking (cf. Kirk-Othmer's Encyclopedia of Chemical Technology, Vol. 22, pp 770-790 (3rd Ed. 1983)). Such cross-linking is particularly desirable in order to improve the physical strength and chemical resistivity of the cellulosic membranes. Furthermore, where chemical derivatization of the membranes is desirable, for example in order to couple protein binding ligands to the hydroxyl groups of the cellulose polymers, base sensitivity is particularly important.

Accordingly, it is an object of the present invention to provide porous cross-linked charged cellulosic polymeric membranes that have a high adsorption capacity for target molecules, such as proteins, nucleic acids and viruses, when substituted with charged ligands. It is a further object of the invention to provide cross-linked cellulosic polymeric membranes in a process that does not adversely affect either their high flux/flow rates nor their minimal protein adsorption and flexibility, and to impart to the membranes an increased resistance to bases in order to allow further chemical modification. It is a further object of the invention to provide membranes prepared by the aforementioned processes. A further object of the invention is to provide methods for separating target molecules from other components in a solution using said membranes based upon the binding affinities of the target molecules.

SUMMARY OF THE INVENTION

According to a first aspect of the invention, there is provided a process for making a porous cross-linked charged cellulosic polymeric membrane comprising
i) adding a base to a porous cellulosic polymeric membrane in the presence of a solution of a bifunctional reagent to cross-link the cellulosic polymer therein,
ii) reacting said membrane with a reagent that introduces a ligand, said ligand comprising a positively or negatively charged group
wherein the resulting porous cross-linked charged cellulosic polymeric membrane swells from 40% to 250% by volume in a solution of water.

It will be understood that steps i) and ii) can be conducted sequentially or simultaneously.

Preferably, the resulting membrane swells by 50% to 250%, more preferably by 100% to 250%, most preferably by 125% to 250% by volume in a solution of water.

Suitably, base is selected from the group consisting of sodium hydroxide, potassium hydroxide, calcium hydroxide, barium hydroxide, tetraalkylammonium hydroxide, sodium carbonate, caesium carbonate, sodium triphosphate, sodium silicate, potassium carbonate, potassium silicate, potassium triphosphate and sodium hydrogen carbonate.

Suitably, the cellulosic polymeric membrane comprises cellulose esters, cellulose ethers, cellulose hydrate, cellulose carbamate, cellulose xanthate, cellulose sulphone or any mixtures thereof.

Suitably, the cellulose ester is an ester selected from the group consisting of cellulose acetate, cellulose nitrate, cellulose xanthate, cellulose propionate, cellulose butyrate and cellulose benzoate.

Suitably, the cellulose ether is an ether selected from the group consisting of methyl cellulose, ethyl cellulose, propyl cellulose, hydroxyethyl cellulose, hydroxypropyl cellulose and carboxymethyl cellulose.

Suitably, the bifunctional reagent is selected from the group consisting of epichlorohydrin, epibromohydrin, diisocyanate, dimethyl urea, dimethyl ethylene urea, dimethylchlorosilane, bis(2-hydroxy ethyl sulfone), glycidyl ether, butanediol diglycidyl ether, divinylsulfone, alkylene dihalogen and hydroxyalkylene dihalogen.

Suitably, the glycidyl ether is selected from the group consisting of butanediol diglycidyl ether, ethylene glycol diglycidyl ether, glycerol diglycidyl ether and polyethylene glycol diglycidyl ether.

Preferably, the bifunctional reagent is epichlorohydrin.

Suitably, a mixture of bifunctional reagents is used.

Suitably, the reagent is selected from the group consisting of glycidyl trimethylammonium chloride (GMAC), diethylaminoethyl chloride, acrylamidopropyltrimethylammonium chloride (GMAC), acrylonitrile, epichlorohydrin, trimethylamine, chloroacetic acid, bromoacetic acid, allyl bromide, bisulphite, allyl glycidyl ether/bisulphite, sodium vinylsulfonate, styrene sulfonate, acrylic acid, acrylamidomethylpropanesulfonic acid, cyanogen bromide, chlorotriazines, diglycidyl ether, N-hydroxysuccinimide, tosyl chloride, tresyl chloride and diisocyanate.

The ligand comprises a positively or negatively charged group; examples of such groups include, but are not limited to, quaternary ammonium ions, amines, amidines, pyridines, pyridinium ions, imidazoles, imidazolinium ions, phosponium ions, sulphonium ions, sulfonates, sulfates, phosphates, phosphonates, phenols and carboxylates and any combination thereof.

Suitably, the process is carried out in the presence of an inorganic salt. Preferably, the salt is sodium sulphate.

Suitably, the membrane comprises pores having a pore size of 0.1 to 10 μm, preferably 0.5 to 10 μm, most preferably 0.8 to 5.0 μm.

Suitably, the membrane comprises a plurality of cellulose acetate groups. Preferably, the membrane comprises a plurality of cellulose acetate groups, the base is sodium hydroxide, the bifunctional reagent is epichlorohydrin, the reagent is glycidyl trimethyl ammonium chloride (GMAC) and the salt is sodium sulphate.

Suitably, the crosslinking process is carried out at 20° C. to 60° C. for a period of at least 1 hour, preferably, at a temperature of 45° C. to 55° C. for a period of at least 1 hour, more preferably at a temperature of 45° C. to 55° C. for a period of 6 to 18 hours, and most preferably at a temperature of 47° C. for a period of 18 hours.

In a second aspect of the present invention, there is provided a porous cross-linked charged cellulosic polymeric membrane prepared by the process comprising
i) adding a base to a porous cellulosic polymeric membrane in the presence of a solution of a bifunctional reagent to cross-link the cellulosic polymer therein,
ii) reacting the membrane with a reagent that introduces a ligand, the ligand comprising a positively or negatively charged group
wherein the resulting porous cross-linked charged cellulosic polymeric membrane swells from 40% to 250% by volume in a solution of water.

According to a third aspect of the present invention, there is provided a method for separating a first component from a second component in a solution or suspension based upon a difference in the binding or adsorption of said first and second components, comprising use of the membrane as hereinbefore described.

In a fourth aspect of the present invention, there is provided a method for separating a target molecule from other components in a solution, said method being a method of chromatography, comprising use of the membrane as hereinbefore described.

Thus a membrane according to the invention may be used for the isolation of a target molecule or compound, particularly for the isolation of biomolecules. Such biomolecules include, but are not limited to, proteins (e.g. monoclonal or polyclonal antibodies, antibody fragments, host cell proteins, membrane proteins, prions), peptides (e.g. dipeptides or oligopeptides), nucleic acids (e.g. DNA such as plasmid DNA, RNA) peptide nucleic acids, endotoxins, viruses, cells (such as bacterial cells, mammalian cells) cell organelles and cell fragments. Alternatively, the membrane is useful to isolate organic molecules, such as metabolites and drug candidates. In an alternative embodiment, the present membrane is useful in identifying any one of the aforementioned molecules or compounds, such as for diagnostic purposes. Thus, the products purified using the present membrane may be drugs or drug targets; vectors for use in therapy, such as plasmids or viruses for use in gene therapy; feed supplements, such as functionalized food; and in vitro and in vivo diagnostic agents. A specific application of a biomolecule purified according to the invention is a drug for personalized medicine. The membrane according to the invention is also useful in purifying a desired liquid from an undesired target compound, such as those described above.

Suitably, the target molecule comprises a binding moiety that binds to the ligand present in the membrane. The target molecule may be any organic or inorganic molecule but preferably it is a biomolecule such as a protein, polypeptide, peptide or a polynucleotide. In some instances, the target molecule is a virus or a chemical constituent of a virus.

Suitably, the solution is a cell extract, cell lysate or cell culture.

Suitably, the ligand and the binding moiety are members of a specific binding pair. Preferably, the ligand and the binding moiety are selected from the group consisting of biotin/steptavidin, biotin/avidin, biotin/neutravidin, biotin/captavidin, epitope/antibody, protein A/immunoglobulin, protein G/immunoglobulin, protein L/immunoglobulin, GST/glutathione, His-tag/Nickel, antigen/antibody, FLAG/M1 antibody, maltose binding protein/maltose, chitin binding protein/chitin, calmodulin binding protein/calmodulin (Terpe, 2003, Appl Microbiol Biotechnol, 60, 523-533) and LUMIO™ reagents/LUMIO™ recognition sequence. The LUMIO™ reagents and recognition sequence are available from Invitrogen Life Corporation, Carlsbad, Calif., USA.

Other examples of ligand/binding moieties are enzyme inhibitor/enzymes (e.g. benzamidine or arginine and serine proteases such as catalase), heparin/coagulation factors, lysine/plasminogen or ribosomal RNA, Procion Red/NADP+ dependent enzymes, Cibacron Blue/serum albumin, Concanavalin A/glucopyranosyl and mannopyranosyl groups, and Protein A or Protein C/Fc region of IgG.

DEFINITIONS

The term 'cross-linked', as applied in the context of the present invention, will be taken to mean that there is a side bond between different chains or parts of a single chain of a polymer (i.e. cellulose polymer) which increases its rigidity and/or stability. By degree of cross-linking is meant the number of such side bonds per unit volume. From the theories of rubber elasticity it is known that the equilibrium swelling in a solvent for the polymer decreases with increasing degree of cross-linking.

In the specification the term 'membrane' will mean a thin sheet or layer, usually pliable in nature, which comprises one or more pores and which generally acts as a filter between a solution placed on one surface and its opposing surface. For the avoidance of doubt, the term 'porous' is used throughout the specification in relation to a membrane or filter to indicate that the article comprises one or more pores.

The term 'base' will take its conventional chemical meaning as a substance with a tendency to gain protons. Thus, for instance, a base is a substance which in aqueous solution reacts with an acid to form a salt and water only and is therefore a substance which provides hydroxyl ions.

The term 'bifunctional reagent' as used herein will mean a compound with two reactive functional groups that can interact with two groups in one molecule or with one group in each of two different molecules.

'ligand' means any chemical moiety which is capable of binding to a target molecule. The ligand will contain one or more charged groups and may be of any size and complexity, ranging from a small molecule fragment containing a few atoms to a large and structurally complex protein.

'Charged group' means a group that contains at least one functionality which is electrically charged at certain pH values or over the entire pH range.

It will be understood that the term 'target molecule' embraces any compound or entity which is targeted for adsorption by the method of the invention.

The term 'chromatography' embraces a family of closely related separation methods. Such methods are all based on the feature that two mutually immiscible phases are brought into contact, wherein one phase is stationary and the other mobile. In the present invention, the membrane constitutes the stationary phase while the solution will constitute the mobile phase. Chromatography can be used either to purify a liquid from a contaminating compound or to recover one or more specific compounds from a liquid.

Conventionally, cells and/or cell debris has been removed by filtration. Once a clarified solution containing, for example, a protein of interest has been obtained, its separation from the other components of the solution is usually performed using a combination of different chromatographic techniques. These techniques separate mixtures of proteins on the basis of their charge, degree of hydrophobicity, affinity properties, size etc. Several different chromatography matrices are available for each of these techniques, allowing tailoring of the purification scheme to the particular protein involved. In the context of the present invention, the protein may be separated predominantly on the basis of charge and/or affinity/adsorption properties.

BRIEF DESCRIPTION OF THE DRAWINGS

FIG. 1 is a plot of increased membrane area against volume.

DETAILED DESCRIPTION OF THE INVENTION

The experiments were carried out to find suitable membrane adsorbers for separation of e.g. DNA and protein. The data show that when the cellulose acetate membranes are cross-linked with low amounts of cross-linker a gel like structure is created that adsorb DNA and proteins much better than highly cross-linked membranes of the same type.

Cellulose acetate membranes can be made both fiber supported or non-supported. The fiber supported membranes used in these examples are from GE Water & Process Technologies and have a 5 μm pore size. For these membranes (which have cellulose acetate coated on a non woven support) the outer dimension of the membrane is determined by the dimensions of the support material and swelling can only take place within the membrane (tightening the pores) or by increasing the thickness. The non-supported membranes used (from Whatman with 0.8 μm pore size) give the opportunity to measure the swelling in terms of area increase since they can swell freely in all directions.

Materials

Table 1 lists the chemicals and membranes used in the experiments. The table also lists the abbreviations used for the chemicals in the text.

Example of Cross-Linking of Cellulose Acetate Membranes

Cross-linking was performed in a 100 ml beaker equipped with a magnetic stirrer. Three membrane circles (diameter 47 mm) were wetted in water and placed between plastic supporting net to keep the membranes fixed in the beaker.

Sodium sulfate was dissolved in water and the solution was heated to 47° C. before epichlorohydrin (ECH) was added. The solution was stirred vigorously for about 5 minutes to ensure that the ECH was dissolved. The membranes were placed in the beaker fixed to the beaker walls with the plastic net. Sodium hydroxide 50% was added in portions of 6×0.175 ml and then 3×0.350 ml with 20 min between each addition. The cross-linking continued for 7-18 h after which the membrane was washed with water.

Table 2 gives the experimental cross-linking recipes for the membranes.

Example of Q-Functionalisation 45 ml GMAC and 5 ml 2M sodium hydroxide solution were mixed in a 50 ml centrifuge vial. One cross-linked membrane circle rolled between plastic nets was placed in the vial. The vial was circulated at room temperature (19-24° C.) for 18 h. The Q-membrane was washed repeated times with water.

Table 2 gives the experimental cross-linking and Q functionalisation recipes for the membranes.

Methods

Area Swelling

The dimension of the membrane circles were measured after cross-linking and after Q-functionalisation. The original Whatman ST 68 membrane circle had a 47 mm diameter.

The area swelling of the ST 68 Q-membranes is calculated according to Equation 1.

$$\text{Area Swelling (\%)} = (((d_2)^2/(d_1)^2) - 1) * 100 \qquad \text{Equation 1:}$$

$d_1$=diameter at origin (47 mm)
$d_2$=diameter after Q-coupling

Volume Swelling

A Ø2.5 cm circle was sampled from the membrane and put on a lens cleaning tissue (Linsenpapier) to soak excess water. The membrane sample was then placed in a dry weight scale (HG 63, Mettler Toledo) and heated to 120° C. for 50 min (or until the weight is constant for 10 min). The weight of the sample was measured every 2 minutes. After the dry weight has been established the membrane was rewetted by adding small portions of water to the membrane.

Water loss: The weight of the water in the membrane (dry weight subtracted from the total weight of swelled membrane)

Water uptake: The amount of water added to the dry membrane in order to re-swell it.

Water Content: The water loss and the water uptake should be equal since it is the water content of the membrane measured in two different ways. If they are equal it suggests that the membrane can regain its original shape after it has been dried.

Volume Swelling: Compares the water content of the Q-membranes with the water content of the membrane before cross-linking and Q-coupling.

Swelling Test Prior to Q-Functionalisation

Before functionalisation with the charged groups, the membrane does not swell to any great extent in water. The reason is that water is not a solvent for unsubstituted cellulose. However, if the membrane is immersed in a good solvent for cellulose, it will swell to an extent determined by the degree of crosslinking. Typical examples of cellulose solvents are: N-methyl morpholine N-oxide (NMMO), dialkylimidazolium salts, lithium chloride-dimethylacetamide, aqueous zinc chloride, copper ammonia complexes and cadmium ammonia complexes.

A swelling test for cross-linked membranes (before Q-functionalisation) utilises NMMO. Mix 15 g 97% NMMO powder with 10 g 50% aqueous NMMO solution in a small crystallization jar. Put into a ventilated oven at 95° C. and let the particles dissolve/melt. If crystals remain in the solution, add a few drops of water.

Check if the NMMO concentration is high enough by adding a small piece of filter paper. When the paper dissolves, the concentration is sufficient. If the paper does not dissolve, let some water evaporate and check again.

Put an approx 25 mm strip of membrane into the solution and let it stand for 15 min. Measure the length of the swollen strip through the bottom of the jar with a ruler. Calculate the length-scale swelling percentage as 100×(A−B)/B, where B is the length before swelling and A the length after swelling.

DNA, BSA and Metanil Binding Assay

The binding capacity of the Q-functionalised membrane was then determined using a Metanil Yellow (Aldrich, Cat. No. 20,202-9), a BSA and a DNA binding assay.

The Metanil Yellow method was developed based upon the capacity of the membrane to remove the colour from a 25 ppm solution of the dye. The method involved inserting a membrane roundel between two column adaptors in a HR16/10 column (GE Healthcare) which was attached to an ÄKTA™ explorer 100 chromatography instrument (GE Healthcare). The dynamic capacity was investigated by pumping a 25 ppm solution of Metanil Yellow at 1 ml/min over the membrane until a 10% breakthrough (Qb10) was obtained.

Detection is made with a UV-sensor at 414 nm.
Capacity was calculated according to:
Area analyzed: 1.5 cm² (diameter: 1.4 cm).
Molecular weight of Metanil: 375.4 g/mol.
Concentration of solution: 25 ppm $$\text{Capacity} (\mu\text{mol/cm}^2) = \frac{\text{Volume absorbed (mL)} \times 25}{375.4 \times 1.5}$$

A DNA binding assay was designed to measure dynamic capacity at 50% breakthrough (Qb50) for DNA. The DNA assay was loaded on to a membrane which was inserted between two adjustable adaptors in a HR16/10 column (GE Healthcare) attached to an ÄKTA™ explorer 10 (GE Healthcare) instrument at a flow rate of 0.5 mL/min. The DNA solution had a concentration of 0.1 mg DNA/mL. The DNA solution was applied to the membrane in a first buffer (buffer A: 25 mM Tris-6M HCl added to adjust to pH 8.0) until a 50% capacity breakthrough and eluted with a second buffer (buffer B: 25 mM Tris and 1M NaCl-6M HCl added to adjust pH to 8.0).

Detection is made with a UV-sensor at 280 nm.
Capacity was calculated according to:
Area analyzed: 1.5 cm² (diameter: 1.4 cm).
Concentration of solution: 0.1 mg/mL $$\text{Capacity} (\text{mg } DNA/\text{cm2}) = \frac{\text{Volume absorbed (mL)} \times 0.1}{1.5}$$

Capacity is also calculated per unit volume by dividing the Qb50 (mg/cm²) value with the membrane thickness.

ST 68 membranes have a thickness of 110 μm and the GE Water CA 5 μm membranes 80 μm.

A BSA binding assay was designed to measure Qb50 for BSA loaded on to a membrane which was inserted between two adjustable adaptors in a HR16/10 column (GE Healthcare) attached to an ÄKTA™ explorer 10 (GE Healthcare) instrument at a flow rate of 0.5 mL/min. The BSA solution had a concentration of 0.1 mg BSA/mL. The BSA solution was applied to the membrane in a first buffer (buffer A: 25 mM Tris-6M HCl added to adjust to pH 8.0) and eluted with a second buffer (buffer B: 25 mM Tris and 1M NaCl-6M HCl added to adjust pH to 8.0).

Detection is made with a UV-sensor at 280 nm.
Capacity was calculated according to:
Area analyzed: 1.5 cm² (diameter: 1.4 cm).
Concentration of solution: 0.1 mg/mL $$\text{Capacity} (\text{mg } BSA/\text{cm2}) = \frac{\text{Volume absorbed (mL)} \times 0.1}{1.5}$$

Capacity is also calculated per unit volume by dividing the Qb50 (mg/cm²) value with the membrane thickness.

ST 68 membranes have a thickness of 110 μm and the CA 5 μm membranes 80 μm.

Table 3 shows the results from the area increase measurements of ST 68 0.8 μm Q-membranes. As can be seen from Table 3, the degree of swelling after Q-coupling depends on the amounts of ECH and sodium sulphate added during cross-linking. Both parameters have a negative effect on the degree of swelling (maximum swelling when both parameters are kept low). After cross-linking the membranes shrink from the original size (from 47 mm to 45 mm) but this shrinkage is equal for all cross-linked membranes independent of cross-linking recipe. If the degree of cross-linking is too low the membrane dissolves during the Q-coupling reaction, this happened for prototype P14 which became a slimy gel.

Table 4 gives the water content of ST 68 Q-membranes.
Table 5 shows the water content of the CA 5 μm Q-membranes. The water content measured on the dry weight scale was found to be a good method to determine swelling. The uptake of water after drying the membrane correlates well with the water loss. This correlation was better for the ST 68 membranes than for the fibre supported membranes (CA 5

µm). These membranes tend to stick to the sample cup (metallic plate used in the dry weight scale) which could limit the ability to regain its original structure. Since theses membranes are fibre supported no area swelling can be observed.

A comparison of the area swelling and volume swelling of ST 68 membranes is given in Table 6, while in FIG. 1 increased area is plotted against increased water content. The two methods to measure the degree of cross-linking with respect to swelling can be seen to correlate well.

Table 7 shows a comparison of membrane swelling prior to and after Q-coupling. It can be seen that the data correlate well with data from the same membranes after Q-coupling.

Table 8 summarises data obtained from the different membranes in terms of their swelling, capacity and cross-linking conditions.

Observations

Swelling is related to the degree of cross-linking. The effect of the cross-linking reaction is dependent on reaction parameters such as concentration of cross-linker, salt and alkali and reaction temperature.

To reach the highest dynamic binding capacities the degree of cross-linking should be kept at a minimum. Both the amount of sodium sulfate and the amount of epichlorohydrin present during cross-linking affect the resulting degree of cross-linking. Loosely cross-linked membranes are made by keeping the amount of sulfate and epichlorohydrin low.

The fiber supported membranes (CA 5 µm) were found to have lower water content than the non-supported (ST 68) membranes. To reach good capacities with the fiber supported membranes the volume swelling should be >40% and preferably >50%. However, higher binding was achieved with the non-supported (ST 68) membranes. As can be seen from Table 8, high capacities were obtained with the non-supported (ST 68) membranes when the volume swelling was >100% and preferably >125%.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

TABLE 1

List of Chemicals

| Chemical substance | Abbreviation | Supplier | Lot |
|---|---|---|---|
| ST 68 Cellulose acetate membrane 0.8 µm | ST 68 | Whatman | ER0813-1 |
| A50SPB0001 Cellulose acetate membrane 5 µm fiber supported | CA 5 µm | GE Water and Process Technologies | A05152D |
| Epichlorohydrin | ECH | | |
| Glycidyl trimethylammonium chloride | GMAC | | |
| Sodium hydroxide (50% solution in water) | NaOH (50%) | | |
| Sodium sulphate | $Na_2SO_4$ | | |
| N-methyl morpholine N-oxide | NMMO | | |
| Prototypes of Q-membranes made from ST 68: P 1-P14 | | | |
| Prototypes of Q-membranes made from CA 5 µm: P 15-P18 | | | |

TABLE 2

Cross-linking and Q-functionalisation conditions

| | | Cross-linking | | | | | Q-functionalisation | | |
|---|---|---|---|---|---|---|---|---|---|
| | | 100 ml $H_2O$ | | | | | NaOH | | Temp |
| Name | Membrane | ECH | $Na_2SO_4$ | NaOH | Temp | Time | GMAC | (2M) | Time | RT = 18-24° C. |
| P1 | ST 68 | 1 ml | 10 g | 0.4 M | 47° C. | 18 h | 45 ml | 5.3 ml | 19 h | RT |
| P2 | ST 68 | 1 ml | 10 g | 0.4 M | 47° C. | 18 h | 45 ml | 5.3 ml | 19 h | RT |
| P3 | ST 68 | 0.75 ml | 10 g | 0.4 M | 47° C. | 18 h | 45 ml | 5.3 ml | 19 h | RT |
| P4 | ST 68 | 1 ml | 10 g | 0.4 M | 47° C. | 7 h | 45 ml | 5.3 ml | 19 h | RT |
| P5 | ST 68 | 1 ml | 0 g | 0.4 M | 20° C. | 7 h | 45 ml | 5.3 ml | 19 h | RT |
| P6 | ST 68 | 2 ml | 10 g | 0.4 M | 47° C. | 18 h | 45 ml | 5 ml | 16 h | RT |
| P7 | ST 68 | 2 ml | 5 g | 0.4 M | 47° C. | 18 h | 45 ml | 5 ml | 16 h | RT |
| P8 | ST 68 | 2 ml | 0 g | 0.4 M | 47° C. | 18 h | 45 ml | 5 ml | 16 h | RT |
| P9 | ST 68 | 1 ml | 10 g | 0.4 M | 47° C. | 18 h | 45 ml | 5 ml | 16 h | RT |
| P10 | ST 68 | 0.75 ml | 10 g | 0.4 M | 47° C. | 18 h | 45 ml | 5 ml | 16 h | RT |
| P11 | ST 68 | 0.5 ml | 10 g | 0.4 M | 47° C. | 18 h | 45 ml | 5 ml | 16 h | RT |
| P12 | ST 68 | 0.5 ml | 10 g | 0.4 M | 47° C. | 18 h | 45 ml | 5 ml | 16 h | RT |
| P13 | ST 68 | 0.5 ml | 5 g | 0.4 M | 47° C. | 18 h | 45 ml | 5 ml | 16 h | RT |
| P14 | ST 68 | 0.5 ml | 0 g | 0.4 M | 47° C. | 18 h | 45 ml | 5 ml | 16 h | RT |
| P15 | CA 5 µm | 1 ml | 10 g | 0.4 M | 47° C. | 6 h | 30 ml | 20 ml | 6 h | RT |
| P16 | CA 5 µm | 0.5 ml | 10 g | 0.4 M | 47° C. | 6 h | 30 ml | 20 ml | 6 h | RT |
| P17 | CA 5 µm | 0.25 ml | 10 g | 0.4 M | 47° C. | 6 h | 30 ml | 20 ml | 6 h | RT |
| P18 | CA 5 µm | 0.38 ml | 10 g | 0.4 M | 47° C. | 7 h | 30 ml | 20 ml | 6 h | RT |

TABLE 3

Results from area increase measurements of ST 68 0.8 μm Q-membranes

| Prototype | Cross-linking conditions ECH | Cross-linking conditions Na$_2$SO$_4$ | Diameter (after cross-linking) d | Diameter (after Q-functionalisation) d$_2$ | Area Swelling ((d$_2$)$^2$/(47)$^2$) − 1 |
|---|---|---|---|---|---|
| P6  | 2 ml    | 10 g | 44.5 | 47 mm | 0% |
| P7  | 2 ml    | 5 g  | 45   | 48 mm | 4% |
| P8  | 2 ml    | 0 g  | 45   | 49 mm | 9% |
| P9  | 1 ml    | 10 g | 45   | 49 mm | 9% |
| P10 | 0.75 ml | 10 g | 45   | 50 mm | 13% |
| P11 | 0.5 ml  | 10 g | 45   | 51 mm | 18% |
| P12 | 0.5 ml  | 10 g | 45   | 56 mm | 42% |
| P13 | 0.5 ml  | 5 g  | 45   | 60 mm | 63% |
| P14 | 0.5 ml  | 0 g  | Not determined | dissolved | |

TABLE 4

Water content ST 68 0.8 μm Q-membranes

| Prototype | Wet weight A (mg) | Dry weight B (mg) | Water loss C (column A − B) (mg) | Water uptake (on re-wetting) D (mg) | Water Content E (average C&D) (mg) | Volume Swelling F |
|---|---|---|---|---|---|---|
| ST 68 0.8 μm | 73 | 15 | 58 | | 58 | |
| P6  | 108 | 14 | 94  | 96  | 95    | 64% |
| P7  | 117 | 17 | 100 | 100 | 100   | 72% |
| P8  | 135 | 13 | 122 | 119 | 120.5 | 108% |
| P9  | 132 | 15 | 117 | 111 | 114   | 97% |
| P10 | 133 | 14 | 119 | 118 | 118.5 | 104% |
| P11 | 149 | 13 | 136 | 136 | 136   | 134% |
| P12 | 181 | 19 | 162 | *   | *     | 179% |
| P13 | 201 | 12 | 189 | 182 | 185.5 | 220% |

* Broken membrane no rewetting was performed.

TABLE 5

Water content CA 5 μm Q-membranes

| Prototype | ECH | Na$_2$SO$_4$ | Wet weight | Dry weight | Water loss | Water uptake (on re-wetting) | Water Content | Volume Swelling |
|---|---|---|---|---|---|---|---|---|
| CA 5 μm |         |      | 52 | 19 | 33 | 32 | 32.5 |     |
| P15     | 1 ml    | 10 g | 60 | 18 | 42 | 39 | 40.5 | 25% |
| P16     | 0.5 ml  | 10 g | 65 | 15 | 50 | 44 | 45.5 | 40% |
| P16 repetition | |  | 60 | 17 | 43 | 45 |      |     |
| P17     | 0.25 ml | 10 g | 85 | 17 | 68 | 58 | 57.5 | 77% |
| P17 repetition | |  | 73 | 16 | 57 | 47 |      |     |
| P18     |         |      | 67 | 16 | 51 | 47 | 49   | 51% |

TABLE 6

A comparisons between two ways of measuring swelling

| Prototype | Cross-linking conditions ECH | Cross-linking conditions Na$_2$SO$_4$ | Area Swelling ((d$_2$)$^2$/(47)$^2$) − 1 | Volume Swelling % |
|---|---|---|---|---|
| P6  | 2 ml    | 10 g | 0%  | 64% |
| P7  | 2 ml    | 5 g  | 4%  | 72% |
| P8  | 2 ml    | 0 g  | 9%  | 108% |
| P9  | 1 ml    | 10 g | 9%  | 97% |
| P10 | 0.75 ml | 10 g | 13% | 104% |

TABLE 6-continued

A comparisons between two ways of measuring swelling

| Prototype | Cross-linking conditions ECH | Cross-linking conditions Na$_2$SO$_4$ | Area Swelling ((d$_2$)$^2$/(47)$^2$) − 1 | Volume Swelling % |
|---|---|---|---|---|
| P11 | 0.5 ml | 10 g | 18% | 134% |
| P12 | 0.5 ml | 10 g | 42% | 179% |
| P13 | 0.5 ml | 5 g  | 63% | 220% |
| P14 | 0.5 ml | 0 g  | N   |     |

TABLE 7

Comparison of Membrane Swelling prior to and after Q-coupling.

| Membrane Reference Number | Swelling in NMMO test (% length) | Swelling after GMAC coupl. (% length) | Metanil capacity (μmol/cm$^2$) | DNA capacity (mg/cm$^2$) | BSA capacity (mg/cm$^2$) |
|---|---|---|---|---|---|
| P1 | 19 | 12 | 6.3 | 0.9 | 0.2 |
| P2 | 19 | 9  | 5.8 | 0.9 | 0.2 |
| P4 | 15 | 10 | 7.4 | 1.1 | 0.3 |
| P5 | 43 | 30 | Not analysed | 2.1 | 3.3 |

TABLE 8

Summary of swelling, capacity and cross-linking data for cellulose membranes

| | | Swelling after Q-functionalisation | | Capacity | | | | Cross-linking 100 ml H$_2$O | | | | |
|---|---|---|---|---|---|---|---|---|---|---|---|---|
| | | | | Qb50 BSA | Qb50 BSA | Qb50 DNA | Qb50 DNA | | | | | |
| Prototype | Membrane | Area Swelling | Volume Swelling | mg/cm$^2$ | mg/ml | mg/cm$^2$ | mg/ml | ECH | Na$_2$SO$_4$ | NaOH | Temp | Time |
| P1 | ST 68 | 15% | — | 0.2 | 20 | 0.87 | 79 | 1 ml | 10 g | 0.4 M | 47° C. | 18 h |
| P2 | ST 68 | 9% | — | 0.2 | 19 | 0.93 | 85 | 1 ml | 10 g | 0.4 M | 47° C. | 18 h |
| P3 | ST 68 | 25% | — | 1.84 | 167 | 2.1 | 191 | 0.75 ml | 10 g | 0.4 M | 47° C. | 18 h |
| P4 | ST 68 | 11% | — | 0.3 | 25 | 1.08 | 98 | 1 ml | 10 g | 0.4 M | 47° C. | 7 h |
| P5 | ST 68 | 55% | — | 3.3 | 303 | 2.13 | 194 | 1 ml | 0 g | 0.4 M | 20° C. | 7 h |
| P6 | ST 68 | 0% | 64% | — | — | — | — | 2 ml | 10 g | 0.4 M | 47° C. | 18 h |
| P7 | ST 68 | 4% | 72% | — | — | — | — | 2 ml | 5 g | 0.4 M | 47° C. | 18 h |
| P8 | ST 68 | 9% | 108% | — | — | — | — | 2 ml | 0 g | 0.4 M | 47° C. | 18 h |
| P9 | ST 68 | 9% | 97% | — | — | — | — | 1 ml | 10 g | 0.4 M | 47° C. | 18 h |
| P10 | ST 68 | 13% | 104% | — | — | — | — | 0.75 ml | 10 g | 0.4 M | 47° C. | 18 h |
| P11 | ST 68 | 18% | 134% | 0.79 | 71 | — | — | 0.5 ml | 10 g | 0.4 M | 47° C. | 18 h |
| P12 | ST 68 | 42% | 179% | 0.74 | 67 | — | — | 0.5 ml | 10 g | 0.4 M | 47° C. | 18 h |
| P13 | ST 68 | 63% | 220% | 3.25 | 295 | — | — | 0.5 ml | 5 g | 0.4 M | 47° C. | 18 h |
| P14 | ST 68 | n | | | | | | 0.5 ml | 0 g | 0.4 M | 47° C. | 18 h |
| P15 | CA 5 μm | n | 25% | 0.11 | 14 | 0.25 | 31 | 1 ml | 10 g | 0.4 M | 47° C. | 6 h |
| P16 | CA 5 μm | n | 40% | 0.24 | 30 | 0.31 | 39 | 0.5 ml | 10 g | 0.4 M | 47° C. | 6 h |
| P17 | CA 5 μm | n | 77% | 0.79 | 99 | 0.45 | 56 | 0.25 ml | 10 g | 0.4 M | 47° C. | 6 h |
| P18 | CA 5 μm | n | 51% | 0.58 | 72 | 0.37 | 46 | 0.38 ml | 10 g | 0.4 M | 47° C. | 7 h |

What is claimed is:

1. A process for making a porous cross-linked charged cellulosic polymeric membrane comprising:
   i) adding a base to a porous cellulose acetate membrane comprising a plurality of acetate groups in the presence of a solution of 0.25-2% epichlorohydrin to cross-link said cellulose acetate therein to provide a cross-linked cellulose acetate membrane, and
   ii) reacting said cross-linked membrane with glycidyl trimethylammonium chloride to introduce a positively charged group
   wherein said process is carried out in the presence of sodium sulfate, and the resulting porous cross-linked charged cellulosic polymeric membrane comprises a plurality of cellulose acetate groups and swells from 40% to 250% by volume in a solution of water.

2. The process of claim 1, wherein the resulting cross-linked cellulosic membrane swells by 125% to 250% by volume in a solution of water.

3. The process of claim 1, wherein said base is selected from the group consisting of sodium hydroxide, potassium hydroxide, calcium hydroxide, barium hydroxide, tetraalkylammonium hydroxide, sodium carbonate, calcium carbonate, sodium triphosphate, sodium silicate, potassium carbonate, potassium silicate, potassium triphosphate and sodium hydrogen carbonate.

4. The process of claim 1, wherein the membrane comprises pores having a pore size of 0.1 to 10 microns.

5. The process of claim 1, wherein the base is sodium hydroxide.

6. The process of claim 1, wherein the crosslinking process is carried out at 20° C. to 60° C. for a period of at least 1 hour.

7. The process of claim 6, wherein the crosslinking process is carried out at a temperature of 45° C. to 55° C. for a period of at least 1 hour.

8. The process of claim 1, wherein said ligand comprises a positively charged group and wherein the resulting porous cross-linked charged cellulosic polymeric membrane has a dynamic BSA capacity of at least 30 mg/ml.

* * * * *